US011546899B2

(12) United States Patent
Xia et al.

(10) Patent No.: US 11,546,899 B2
(45) Date of Patent: *Jan. 3, 2023

(54) SYSTEM AND METHOD FOR ALLOCATING RESOURCE BLOCKS

(71) Applicant: ZTE CORPORATION, Guangdong (CN)

(72) Inventors: Shuqiang Xia, Shenzhen (CN); Xianghui Han, Shenzhen (CN); Wen Zhang, Shenzhen (CN); Chunli Liang, Shenzhen (CN); Jing Shi, Shenzhen (CN); Zhisong Zuo, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/240,711

(22) Filed: Apr. 26, 2021

(65) Prior Publication Data

US 2021/0258932 A1 Aug. 19, 2021

Related U.S. Application Data

(63) Continuation of application No. 16/673,221, filed on Nov. 4, 2019, now Pat. No. 10,993,219, which is a
(Continued)

(51) Int. Cl.
*H04W 72/04* (2009.01)
*H04W 84/04* (2009.01)

(52) U.S. Cl.
CPC ........ *H04W 72/042* (2013.01); *H04W 84/042* (2013.01)

(58) Field of Classification Search
CPC ............. H04W 72/042; H04W 84/042; H04W 72/1289; H04L 5/0044; H04L 5/0053
See application file for complete search history.

(56) References Cited

U.S. PATENT DOCUMENTS 9,246,841 B2 * 1/2016 Hong .................... H04W 72/04
10,251,161 B2 4/2019 Kim et al.
(Continued)

FOREIGN PATENT DOCUMENTS

CN 101247307 A 8/2008
CN 101651906 A 2/2010
(Continued)

OTHER PUBLICATIONS

Communication Pursuant to Rules 70(2) and 70a(2) EPC on EP 17908328.2 dated May 12, 2020 (1 page).
Extended European Search Report on EP 17908328.2 dated Apr. 24, 2020 (9 pages).
(Continued)

*Primary Examiner* — Afshawn M Towfighi
(74) *Attorney, Agent, or Firm* — Foley & Lardner LLP

(57) ABSTRACT

A system and method for allocating network resources are disclosed herein. In one embodiment, the system and method are configured to perform: determining a resource indication value based on at least a first parameter and a second parameter, the resource indication value indicative of a number of resource blocks to be allocated to a communication node, wherein a number of possible different values of the resource indication value is limited by a predefined relationship between the first parameter and the second parameter; and transmitting the resource indication value to the communication node.

20 Claims, 3 Drawing Sheets

Related U.S. Application Data continuation of application No. PCT/CN2017/083347, filed on May 5, 2017.

(56) References Cited

U.S. PATENT DOCUMENTS

| | | | | |
|---|---|---|---|---|
| 2012/0275413 | A1* | 11/2012 | Hong | H04W 72/042 370/329 |
| 2013/0163553 | A1* | 6/2013 | Lee | H04L 5/0055 370/329 |
| 2015/0341927 | A1* | 11/2015 | Wei | H04W 72/14 370/280 |
| 2018/0192406 | A1 | 7/2018 | Tang et al. | |

FOREIGN PATENT DOCUMENTS

| | | |
|---|---|---|
| CN | 102550108 A | 7/2012 |
| CN | 102573076 A | 7/2012 |
| EP | 2 830 378 A1 | 1/2015 |

OTHER PUBLICATIONS

International Search Report and Written Opinion on PCT International Application No. PCT/CN2017/083347 dated Jan. 30, 2018.
Mediatek Inc: "Views on Non-contiguous Resource Allocation in Uplink LTE-A", 3GPP Draft; RI-101021, 3rd Generation Partnership Project (3GPP), Mobile Competence Centre , 650, Route Des Lucioles , F-06921 Sophia-Antipolis Cedex , France, vol. RAN WGI, No. San Francisco, USA; Feb. 22, 2010, Feb. 16, 2010 (Feb. 16, 2010), XP050418595, [retrieved on Feb. 16, 2010] paragraphs [0002], [0003].
Non-Final Office Action on U.S. Appl. No. 16/673,221 dated Oct. 19, 2020.
Notice of Allowance on U.S. Appl. No. 16/673,221 dated Feb. 3, 2021.
PANTECH:"On the non-contiguous UL resource allocation", 3GPP Draft; RI-100989, 3rd Generation Partnership Project (3GPP), Mobile Competence Centre ; 650, Route Des Lucioles , F-06921 Sophia-Antipolis Cedex , France, vol. RAN WGI, No. San Francisco, USA; Feb. 22, 2010, Feb. 16, 2010 (Feb. 16, 2010), XP050418570, [retrieved on Feb, 16, 2010]* paragraphs [02.4], [0004] *.

* cited by examiner

SYSTEM AND METHOD FOR ALLOCATING RESOURCE BLOCKS

CROSS REFERENCE TO RELATED APPLICATION

This application claims the benefit of priority under 35 U.S.C. § 120 as a continuation of U.S. Non-Provisional patent application Ser. No. 16/673,221, filed on Nov. 4, 2019, which claims the benefit of priority under 35 U.S.C. § 120 as a continuation of PCT Patent Application No. PCT/CN2017/083347, filed on May 5, 2017, the disclosure of each of which is incorporated herein by reference in its entirety.

TECHNICAL FIELD

The disclosure relates generally to wireless communications and, more particularly, to systems and methods for allocating resource blocks.

BACKGROUND

In wireless communications, when a base station (BS) is preparing to transmit and receive data from a user equipment (UE), a scheduling process is typically performed before the BS actually transmits and receives the data from the UE. Such a scheduling process typically provides some control information (e.g., downlink control information (DCI)) that is transmitted through one or more physical channels (e.g., physical downlink control channel (PDCCH)) to the UE. In particular, the control information comprises various specified parameters that the UE may use for receiving and transmitting the data such as, for example, parameters for resource block allocation.

In general, the BS has various ways for allocating respective resource blocks to the UE through downlink and uplink communications. In the downlink communication, the above-mentioned DCI that comprises the parameters for resource block allocation can be provided in various formats (hereinafter "DCI formats"). For example, the BS uses a resource indication value (RIV) to indicate a respective contiguous sequence of resource blocks that can be used by the UE, and more specifically, the RIV is determined based on a starting resource block and a length of the contiguous sequence of resource blocks, which is typically known as DCI format 1A or 1B.

Based on different amounts of the resource blocks desired to be allocated, the RIV is typically presented as a range of integer values (e.g., 0 to 20), and is then used to determine how many bits (digital bits) the BS/UE will need to accommodate all the values of the RIV. For example, when RIV ranges from 0 to 20, the number of bits that can accommodate all the values of the RIV (i.e., 21) is at least 5 (because $2^5 > 21 > 2^4$).

Existing formats to allocate the resource blocks, including the above-mentioned type 2 downlink DCI format and uplink type 0 DCI format, are directed to allocating one or more "contiguous" sequence of resource blocks such as, for example, plural sequences with a common fixed starting resource block location but each with a "contiguously" increasing/decreasing length of resource blocks, plural sequences with a common fixed length of the resource blocks but each with a "contiguously" increasing/decreasing starting resource block location, etc.

In the 5G network, however, various communication demands for respective applications (e.g., Internet of Things (IoT), massive Machine Type Communication (mMTC), etc.), are emerging, which may require one or more non-contiguous sequences of resource blocks to be used. For example, in some cases, plural sequences of resource blocks may be desired, wherein the plural sequences of resource blocks have a common fixed starting resource block location but each has a "non-contiguously" increasing/decreasing length (e.g., 5, 10, 15, 20, etc.) of the resource blocks. Existing formats for allocating resource blocks, however, require the starting resource block location and/or length of the resource block sequences to increase/decrease contiguously. Thus, for non-contiguously increasing or decreasing RB sequence lengths, or non-contiguous RB sequence starting locations, such existing formats would require extra overhead bits to account for such variations and, thus disadvantageously cause a waste of bits. Therefore, existing formats and/or techniques for allocating resource blocks are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method includes: determining a resource indication value based on at least a first parameter and a second parameter, the resource indication value indicative of a number of resource blocks to be allocated to a communication node, wherein a number of possible different values of the resource indication value is limited by a predefined relationship between the first parameter and the second parameter; and transmitting the resource indication value to the communication node.

In a further embodiment, a method includes: receiving by a communication node a resource indication value determined based on at least a first parameter and a second parameter, the resource indication value indicative of a number of resource blocks to be allocated to the communication node, wherein a number of possible different values of the resource indication value are limited by a predefined relationship between the first parameter and the second parameter; based on the received resource indication value, determining the number of resource blocks allocated to the communication node.

In another embodiment, a first communication node includes: at least one processor configured to determine a resource indication value based on at least a first parameter and a second parameter, the resource indication value indicative of a number of resource blocks to be allocated to a second communication node, wherein a number of possible different values of the resource indication value is limited by a predefined relationship between the first parameter and the second parameter; and a transmitter configured to transmit the resource indication value to the second communication node.

In yet another embodiment, a communication node, includes: a receiver configured to receive a resource indication value determined based on at least a first parameter and a second parameter, the resource indication value indicative of a number of resource blocks to be allocated to the communication node, wherein a number of possible different values of the resource indication value are limited by a predefined relationship between the first parameter and the second parameter; and at least one processor configured to determine the number of resource blocks allocated to the communication node based on the received resource indication value.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Figure 1:
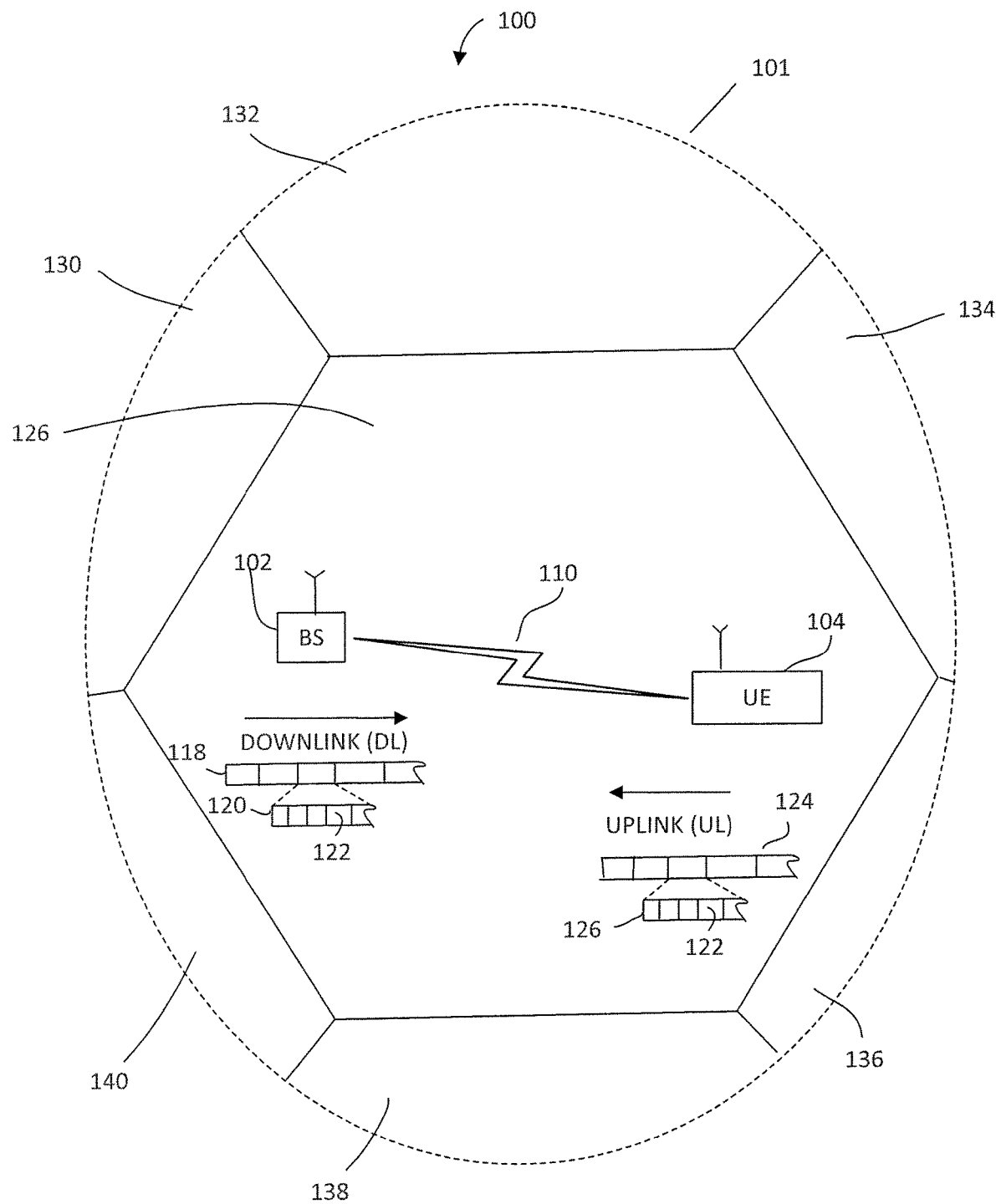
FIG. 1 illustrates an exemplary cellular communication network in which techniques disclosed herein may be implemented, in accordance with an embodiment of the present disclosure.

FIG. 1 illustrates an exemplary wireless communication network 100 in which techniques disclosed herein may be implemented, in accordance with an embodiment of the present disclosure. The exemplary communication network 100 includes a base station (BS) 102 and a user equipment (UE) device 104 that can communicate with each other via a communication link 110 (e.g., a wireless communication channel), and a cluster of notional cells 126, 130, 132, 134, 136, 138 and 140 overlaying a geographical area 101. In FIG. 1, the BS 102 and UE 104 are contained within the geographic boundary of cell 126. Each of the other cells 130, 132, 134, 136, 138 and 140 may include at least one base station operating at its allocated bandwidth to provide adequate radio coverage to its intended users. For example, the base station 102 may operate at an allocated channel transmission bandwidth to provide adequate coverage to the UE 104. The base station 102 and the UE 104 may communicate via a downlink radio frame 118, and an uplink radio frame 124 respectively. Each radio frame 118/124 may be further divided into sub-frames 120/126 which may include data symbols 122/128. In the present disclosure, the base station (BS) 102 and user equipment (UE) 104 are described herein as non-limiting examples of "communication nodes," generally, which can practice the methods disclosed herein. Such communication nodes may be capable of wireless and/or wired communications, in accordance with various embodiments of the invention.

Figure 2:
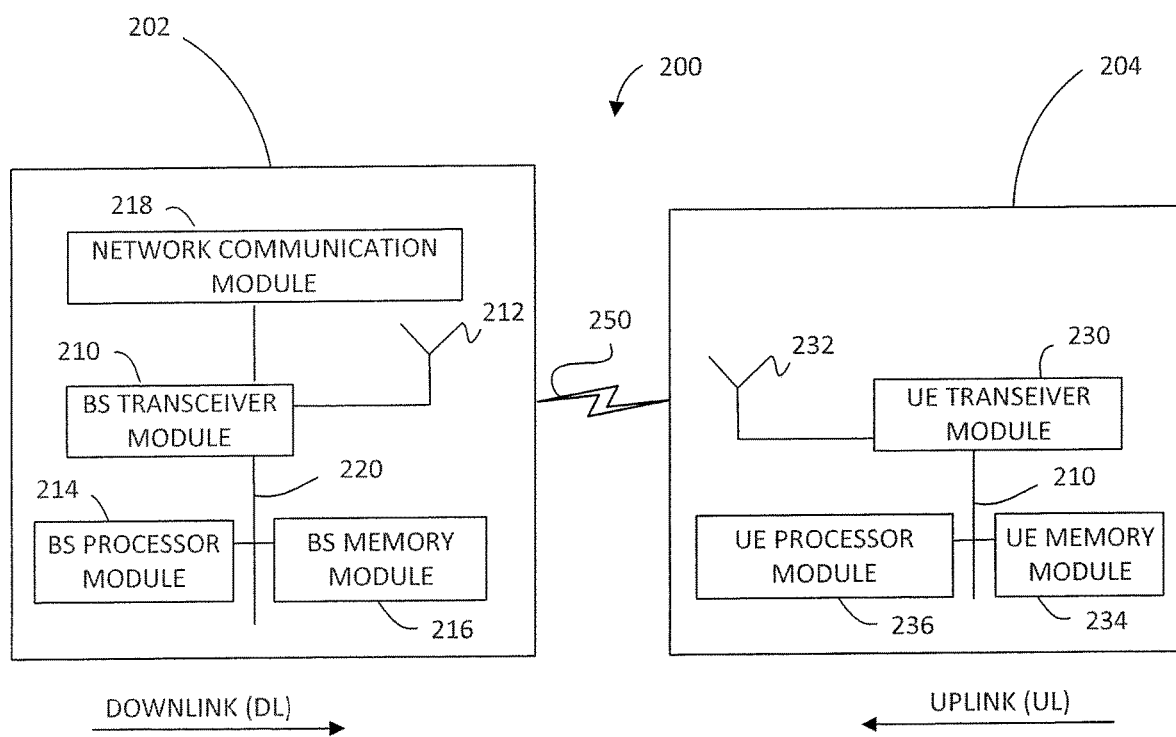
FIG. 2 illustrates block diagrams an exemplary base station and user equipment device, in accordance with some embodiments of the invention.

FIG. 2 illustrates a block diagram of an exemplary wireless communication system 200 for transmitting and receiving wireless communication signals, e.g., OFDM/OFDMA signals, in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

System 200 generally includes a base station 202 and a UE 204. The base station 202 includes a BS transceiver module 210, a BS antenna 212, a BS processor module 214, a BS memory module 216, and a network communication module 218, each module being coupled and interconnected with one another as necessary via a date communication bus 220. The UE 204 includes a UE transceiver module 230, a UE antenna 232, a UE memory module 234, and a UE processor module 236, each module being coupled and interconnected with one another as necessary via a date communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, UE transceiver 230 may be referred to herein as an "uplink" transceiver 230 that includes a RF transmitter and receiver circuitry that are each coupled to the antenna 232. A duplex switch (not shown) may alternatively couple the uplink transmitter or receiver to the uplink antenna in time duplex fashion.

Similarly, in accordance with some embodiments, the BS transceiver 210 may be referred to herein as a "downlink" transceiver 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceivers 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some exemplary embodiments, the UE transceiver 608 and the base station transceiver 602 are configured to support industry standards such as the Long Term Evolution (LTE) and emerging 5G standards, and the like. It is understood, however, that the invention is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 602 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)).

Referring again to FIG. 1, as discussed above, when the BS 102 is preparing to transmit and receive data from the UE 104, a scheduling process is typically performed before the BS actually transmits and receives the data from the UE 104. During such a scheduling process, control information such as DCI that includes resource block allocation information is typically transmitted from the BS 102 to the UE 104 via one or more physical channels, e.g., a PDCCH.

In some embodiments, a method for a BS to allocate a plurality of sequences of resource blocks for a UE is disclosed. More particularly, the plurality of sequences of resource blocks may include a common starting resource block location that is represented by a variable "$y_1$," and each include a non-contiguous length of resource blocks that is represented by a variable "$x_1L$," wherein "$x_1$" and "$y_1$" are positive integers and "L" is a positive constant integer that is pre-defined. In some embodiments, a maximum number of available resource blocks that the BS can provide to the UE may be "N," which is also a pre-defined positive constant integer. As such, according to some embodiments, N, $x_1$, and $y_1$ may satisfy the condition: $x_1L+y_1 \le N$.

In some examples, the variable $x_1$ may be a series of contiguous integers (i.e., having a range of values). Such a range of the variable $x_1$ has a minimum value $x_{1min}$ and a maximum value $x_{1max}$. Similarly, the variable $y_1$ may also be a series of contiguous integers (i.e., having a range of values).

As such, the method, in this embodiment, to allocate the plurality of sequences of resource blocks is described as follows. First, in some embodiments, the BS may determine the ranges of the variables $x_1$ and $y_1$, respectively, based on the above condition ($x_1L+y_1 \le N$). Accordingly, a respective RIV can be determined using the following equation (1).

$$RIV = (N + 1 - x_{1min}L)(x_1 - x_{1min}) - \frac{L(x_1 - x_{1min})(x_1 - x_{1min} - 1)}{2} + y_1 \quad (1)$$

Since the variables $x_1$ and $y_1$ each has a range, the RIV may have plural possible values. In some embodiments, equation (2) as shown below is used to determine the number of all the possible values of the RIV.

$$M = [x_{1max} - x_{1min} + 1]\left[N + 1 - \frac{L(x_{1max} + x_{1min})}{2}\right] \quad (2)$$

Once the "M" value is retrieved, a total number of bits that the BS needs to transmit the plurality of sequences of resource blocks can be derived using the following equation (3).

$$K = \lceil \log_2 M \rceil \quad (3)$$

Table I as shown below is an example in which the pre-defined N and L are 25 and 8, respectively, and the BS determines that the variables $x_1$ and $y_1$ can vary from 1 to 3 and from 0 to 17, respectively based on the condition ($x_1L+y_1 \leq N$). In other words, the plurality of sequences of resource blocks may include a plurality of subsets of sequences of resource blocks that each has a particular $x_1L$ and $y_1$ value so as to determine a respective resource block length and starting resource block location. For example, a first subset of sequences of resource blocks that have a common starting resource block location at 0 ($y_1=0$) and each has a respective length ($x_1L$) 8, 16, and 24 when $x_1$ is equal to 1, 2, and 3, respectively; a second subset of sequences of resource blocks that have a common starting resource block location at 1 ($y_1=1$) and each has a respective length ($x_1L$) 8, 16, and 24 when $x_1$ is equal to 1, 2, and 3, respectively; and so on. It is noted that although the starting resource block location ($y_1$) may be "contiguously" changed, the resource block lengths ($x_1L$) may be "non-contiguously" changed.

TABLE I

| N = 25, L = 8 | | | | | |
| --- | --- | --- | --- | --- | --- |
| x1 | y1 | RIV | x1 | y1 | RIV |
| 1 | 0 | 0 | 1 | 16 | 16 |
| 1 | 1 | 1 | 1 | 17 | 17 |
| 1 | 2 | 2 | 2 | 0 | 18 |
| 1 | 3 | 3 | 2 | 1 | 19 |
| 1 | 4 | 4 | 2 | 2 | 20 |
| 1 | 5 | 5 | 2 | 3 | 21 |
| 1 | 6 | 6 | 2 | 4 | 22 |
| 1 | 7 | 7 | 2 | 5 | 23 |
| 1 | 8 | 8 | 2 | 6 | 24 |
| 1 | 9 | 9 | 2 | 7 | 25 |
| 1 | 10 | 10 | 2 | 8 | 26 |
| 1 | 11 | 11 | 2 | 9 | 27 |
| 1 | 12 | 12 | 3 | 0 | 28 |
| 1 | 13 | 13 | 3 | 1 | 29 |
| 1 | 14 | 14 | | | |
| 1 | 15 | 15 | | | |

As shown in Table I, when N and L are 25 and 8, respectively, $x_1$ and $y_1$ can vary from 1 to 3 and from 0 to 17, respectively, and the condition $x_1L+y_1 \leq N$ is satisfied, a total number of different RIV values is 30 (i.e., M=30). Accordingly, using the equation (3), a total number of bits (i.e., K) that the BS needs to transmit the plurality of sequences of resource blocks is 5, because $2^5=32>30>2^4=16$. In comparison, existing formats to transmit a total number of 25 (N) resource blocks may require up to 9 bits because existing formats do not account for the "L" value. More specifically, to account for the total number (N) of 25, existing formats require $N(N+1)/2=325$ different RIV values, which requires 9 bits (because $2^9=512>325>2^8=256$).

Alternatively, in some embodiments, once the BS determines the ranges of the variables $x_1$ and $y_1$, respectively, based on the above condition ($x_1L+y_1 \leq N$), the BS may use one of equation (1-a), (1-b) and (1-c) below (different from equation (1)) to determine the RIV value while keeping the total number of bits ("K value") the same.

$$x_1' = x_1 - x_{1min} \quad (1\text{-a})$$
$$N' = N - x_{1min}L$$
$$k = \left\lfloor \frac{N'-y_1}{L} \right\rfloor, s = (N'-y_1)\%L$$
$$RIV = \frac{k(k+1)L}{2} + x_1'p + s$$

$$\text{where } p = \begin{cases} N'\%L+1, k = \left\lfloor \frac{N'}{L} \right\rfloor \\ L, \text{otherwise} \end{cases} \text{ or} \quad (1\text{-b})$$

$$RIV = (N+1-x_{1max}L)(x_{1max}-x_1) + \frac{L(x_{1max}-x_1)(x_{1max}-x_1-1)}{2} + N - x_1L - y_1 \text{ or}$$

$$RIV = \quad (1\text{-c})$$
$$(N+1-x_{1max}L)(x_{1max}-x_1) + \frac{L(x_{1max}-x_1)(x_{1max}-x_1-1)}{2} + y_1$$

In yet another embodiment, a method for a BS to allocate a plurality of sequences of resource blocks for a UE is disclosed. More particularly, the plurality of sequences of resource blocks may include a common length of resource blocks that is represented by a variable "$y_2$," and each include a non-contiguous starting resource block location that is represented by a variable "$x_2L$," wherein "$x_2$" and "$y_2$" are positive integers and "L" is a pre-defined constant integer. In some embodiments, a maximum number of available resource blocks that the BS can provide to the UE may be "N," which is also a pre-defined constant integer. As such, according to some embodiments, N, $x_2$, and $y_2$ may satisfy the condition: $x_2L+y_2 \leq N$.

In some examples, the variable $y_2$ may be a series of contiguous integers (i.e., having a range of values). Such a range of the variable $y_2$ has a minimum value $y_{2min}$. Similarly, the variable $x_2$ may also be a series of contiguous integers (i.e., having a range of values).

As such, in this embodiment, the method to allocate the plurality of sequences of resource blocks is described as follows. First, in some embodiments, the BS may determine the ranges of the variables $x_2$ and $y_2$, respectively, based on the above condition ($x_2L+y_2 \leq N$). Accordingly, a respective RIV can be determined using the following equation (4).

$$RIV = (N+1-y_{2min})x_2 - \frac{L_2(x_2-1)}{2} + y_2 - y_{2min} \quad (4)$$

Since the variables $x_2$ and $y_2$ each has a range, the RIV may have plural possible values. In some embodiments, equation (5) as shown below is used to determine the number of all possible values of the RIV.

$$M = \left(\left\lfloor \frac{N-y_{2min}}{L} \right\rfloor + 1\right)\left(N - y_{2min} + 1 - \frac{L}{2}\left\lfloor \frac{N-y_{2min}}{L} \right\rfloor\right) \quad (5)$$

Once the "M" value is retrieved, a total number of bits, "K," that the BS needs to transmit the plurality of possible sequences of resource blocks can be derived using the following equation (6).

$$K = \lceil \log_2 M \rceil \quad (6)$$

As mentioned above, each of the variables $x_2$ and $y_2$ has a respective range of values. For $y_2$, its respective range has a minimum value $y_{2min}$; and for $x_2$, its respective range has a minimum value $x_{2min}$ and a maximum value $x_{2max}$. As such, the equation (4) to derive the RIV may be represented as equation (7), and the corresponding equation (5) to estimate the M value may be presented as equation (8), which are shown below, respectively.

$$RIV = (N + 1 - x_{2min}L - y_{2min})(x_2 - x_{2min}) - \frac{L(x_2 - x_{2min})(x_2 - x_{2min} - 1)}{2} + y_2 - y_{2min} \quad (7)$$

$$M = [x_{2max} - x_{2min} + 1]\left[N - y_{2min} + 1 - \frac{L}{2}(x_{2max} + x_{2min})\right] \quad (8)$$

And the "K" bits may be estimated by using the M value derived from the equation (8) and the equation (6). More specifically, $x_{2min}$, $x_{2max}$, and $y_{2min}$ may further satisfy $$0 \geq x_{2min} \leq x_{2max} \leq \left\lfloor \frac{N - y_{2min}}{L} \right\rfloor.$$

Alternatively, in some embodiments, once the BS determines the respective ranges of the variables $x_2$ and $y_2$ (i.e., $x_{2min}$, $x_{2max}$, $y_{2min}$), based on the above condition ($x_2L+y_2\leq N$), the BS may use one of equations (7-a), (7-b), and (7-c) below (different from equation (7)) to determine the RIV value while keeping the total number of bits ("K value") the same.

$$x'_2 = x_2 - x_{2min} \quad (7\text{-a})$$

$$y'_2 = y_2 - y_{2min}$$

$$N' = N - x_{2min}L - y_{2min}$$

$$k = \left\lfloor \frac{N' - y'_2}{L} \right\rfloor, s = (N' - y'_2) \% L$$

$$RIV = \frac{k(k+1)L}{2} + x'_2 p + s$$

$$\text{where } p = \begin{cases} N \% L + 1, k = \left\lfloor \frac{N'}{L} \right\rfloor \\ L, \text{ otherwise} \end{cases}$$

wherein "%" represents the modulo operation, or $$RIV = (N + 1 - x_{2max}L - y_{2min})(x_{2max} - x_2) + \frac{L(x_{2max} - x_2)(x_{2max} - x_2 - 1)}{2} + N - x_2L - y_2 - y_{2min} \text{ or} \quad (7\text{-b})$$

$$RIV = (N + 1 - x_{2max}L - y_{2min})(x_{2max} - x_2) + \frac{L(x_{2max} - x_2)(x_{2max} - x_2 - 1)}{2} + y_2 - y_{2min} \quad (7\text{-c})$$

Yet in another embodiment, a method for a BS to allocate a plurality of sequences of resource blocks for a UE is disclosed. More particularly, the plurality of sequences of resource blocks may each include a non-contiguous length of resource blocks that is represented by a variable "$y_3Q$," and each include a non-contiguous starting resource block location that is represented by a variable "$x_3L$," wherein "$x_3$" and "$y_3$" are positive integers, and "L" and "Q" are pre-defined constant integers. In some embodiments, L and Q are positive integers larger than 1. Moreover, L=PQ, where P is also a pre-defined constant integer that is a positive integer larger than 1. In some embodiments, a maximum number of available resource blocks that the BS can provide to the UE may be "N," which is also a pre-defined constant integer. As such, according to some embodiments, N, $x_3$, and $y_3$ may satisfy the condition: $x_3L+y_3Q\leq N$.

The equations used to determine the RIV value is substantially similar as above-described embodiments. For example, based on L=PQ and $x_3L+y_3Q\leq N$, $x_3P+y_3\leq N/Q$ can be derived. In the following discussion, a variable N' is used to represent N/Q.

In some embodiments, $x_3$ may be one value of a contiguous integer sequence. As such, $x_3$ has a minimum value $x_{3min}$ and a maximum value $x_{3max}$. Based on $x_3P+y_3\leq N/Q$, $x_{3max}$ can be a value up to (N'/P), and similarly, $y_3$ has a minimum value $y_{3min}$. Accordingly, the RIV value can be derived as follows.

$$RIV = (N' + 1 - x_{3min} - y_{3min}L)(x_3 - x_{3min}) - \frac{P(x_3 - x_{3min})(x_3 - x_{3min} - 1)}{2} + y_3 - y_{3min}$$

Then respective M and K values can be determined using the following equations.

$$M = (x_{3max} - x_{3min} + 1)\left[N' - y_{3min} + 1 - \frac{P(x_{3max} + x_{3min})}{2}\right]$$

$$K = \lceil \log_2 M \rceil$$

Yet in another embodiment, a method for a BS to allocate a plurality of resource blocks for a UE is disclosed. More particularly, the BS assigns two types of resource blocks, type 1 and type 2, to the UE. The type 1 resource block is L times larger than the type 2 resource block in terms of numbers of resource elements, wherein L is a positive integer that is larger than 1. According to some embodiments, the resource elements can be any of a variety of resource elements, e.g., time resource elements, frequency resource elements, symbol resource elements, power resource elements, or a combination thereof. In an example, when the type 1 and type 2 resource blocks extend across a same bandwidth (in frequency), the type 1 resource block extends over a time length that is L times longer than a time length of the type 2 resource block. In another example, when the type 1 and type 2 resource blocks extend over a same time length, the type 1 resource block extends across a bandwidth that is L times wider than a bandwidth of the type 2 resource block.

In a particular example under this embodiment, a maximum number of available resource blocks that the BS can provide to the UE may be N of type 2 resource blocks. Moreover, the BS can assign a number "x" of the type 1 resource blocks and a number of "y" of the type 2 resource blocks to the UE, wherein x and y are positive integers, minimum values of x and y are 0, respectively, and N, x, and y satisfy the inequality condition: $xL+y\leq N$.

As such, a method to allocate resource blocks can be implemented as follows. First, determining whether (x,y) includes (0,0). If so, RIV can be estimated using equation (9), then a respective M value can be estimated using equation (10), and the K value can be estimated using equation (11). If (x,y) does not equal (0,0), RIV can be estimated using equation (12), then a respective M value can be estimated using equation (13), and the K value can be estimated using equation (11).

$$RIV = (N+1)x - \frac{L(x-1)x}{2} + y \quad (9)$$

$$M = \left(\left\lfloor\frac{N}{L}\right\rfloor + 1\right)\left(N + 1 - \frac{L}{2}\left\lfloor\frac{N}{L}\right\rfloor\right) \quad (10)$$

$$K = \lceil \log_2 M \rceil \quad (11)$$

$$RIV = (N+1)x - \frac{L(x-1)x}{2} + y - 1 \quad (12)$$

$$M = \left(\left\lfloor\frac{N}{L}\right\rfloor + 1\right)\left(N + 1 - \frac{L}{2}\left\lfloor\frac{N}{L}\right\rfloor\right) - 1 \quad (13)$$

Similarly, in some alternative embodiments, the RIV value derived by equation (9) can be derived using one of equations (9-1), (9-b) and (9-c) below, which are respectively described as follows.

$$k = \left\lfloor\frac{N-y}{L}\right\rfloor, s = (N-y)\%L$$

$$RIV = \frac{k(k+1)L}{2} + xp + s \quad (9\text{-a})$$

where $p = \begin{cases} N\%L + 1, k = \left\lfloor\frac{N}{L}\right\rfloor \\ L, \text{ otherwise} \end{cases}$ or $$RIV = (N + 1 - x_{max}L)(x_{max} - x) + \frac{(x_{max} - x - 1)}{2} + N - xL - y \quad (9\text{-b})$$

or $$RIV = (N + 1 - x_{max}L)(x_{max} - x) + \frac{(x_{max} - x - 1)}{2} + y \quad (9\text{-c})$$

where $$x_{max} = \left\lfloor\frac{N}{L}\right\rfloor$$

Table II below shows some exemplary values of x and y and corresponding RIV values when N=8 and L=2, and when N=9 and L=2, respectively. In accordance with some embodiments, by providing the number of type 1 resource blocks (x) allocated to the UE and the number of type 2 resource blocks (y) allocated to the UE, subsequent procedures performed by the UE may be simplified. For example, the UE may perform a blind detection to determine respective resource block starting locations of type 1 and type 2 resource blocks. Thus, once the numbers of type 1 and type 2 resource blocks are determined (i.e., x and y), the UE may readily use the allocated resource blocks.

| N = 8 | | | N = 9 | | |
|---|---|---|---|---|---|
| X | y | RIV | x | y | RIV |
| 0 | 1 | 0 | 0 | 1 | 0 |
| 0 | 2 | 1 | 0 | 2 | 1 |
| 0 | 3 | 2 | 0 | 3 | 2 |
| 0 | 4 | 3 | 0 | 4 | 3 |

-continued

| N = 8 | | | N = 9 | | |
|---|---|---|---|---|---|
| X | y | RIV | x | y | RIV |
| 0 | 5 | 4 | 0 | 5 | 4 |
| 0 | 6 | 5 | 0 | 6 | 5 |
| 0 | 7 | 6 | 0 | 7 | 6 |
| 0 | 8 | 7 | 0 | 8 | 7 |
| 1 | 0 | 8 | 0 | 9 | 8 |
| 1 | 1 | 9 | 1 | 0 | 9 |
| 1 | 2 | 10 | 1 | 1 | 10 |
| 1 | 3 | 11 | 1 | 2 | 11 |
| 1 | 4 | 12 | 1 | 3 | 12 |
| 1 | 5 | 13 | 1 | 4 | 13 |
| 1 | 6 | 14 | 1 | 5 | 14 |
| 2 | 0 | 15 | 1 | 6 | 15 |
| 2 | 1 | 16 | 1 | 7 | 16 |
| 2 | 2 | 17 | 2 | 0 | 17 |
| 2 | 3 | 18 | 2 | 1 | 18 |
| 2 | 4 | 19 | 2 | 2 | 19 |
| 3 | 0 | 20 | 2 | 3 | 20 |
| 3 | 1 | 21 | 2 | 4 | 21 |
| 3 | 2 | 22 | 2 | 5 | 22 |
| 4 | 0 | 23 | 3 | 0 | 23 |
|  |  |  | 3 | 1 | 24 |
|  |  |  | 3 | 2 | 25 |
|  |  |  | 3 | 3 | 26 |
|  |  |  | 4 | 0 | 27 |
|  |  |  | 4 | 1 | 28 |

In the above discussions, a respective K value (i.e., a total number bits needed) can be determined when respective ranges of x (e.g., x1, x2, and x3) and y (e.g., y1, y2, and y3) are determined. In yet another embodiment, a total number of "available" bits can be used may be set to equal K", which can be set to be smaller than K by a predetermined amount. As such, a respective RIV value can be represented as any of integer value between a minimum value and a maximum value of $2^{K''}$.

Figure 3:
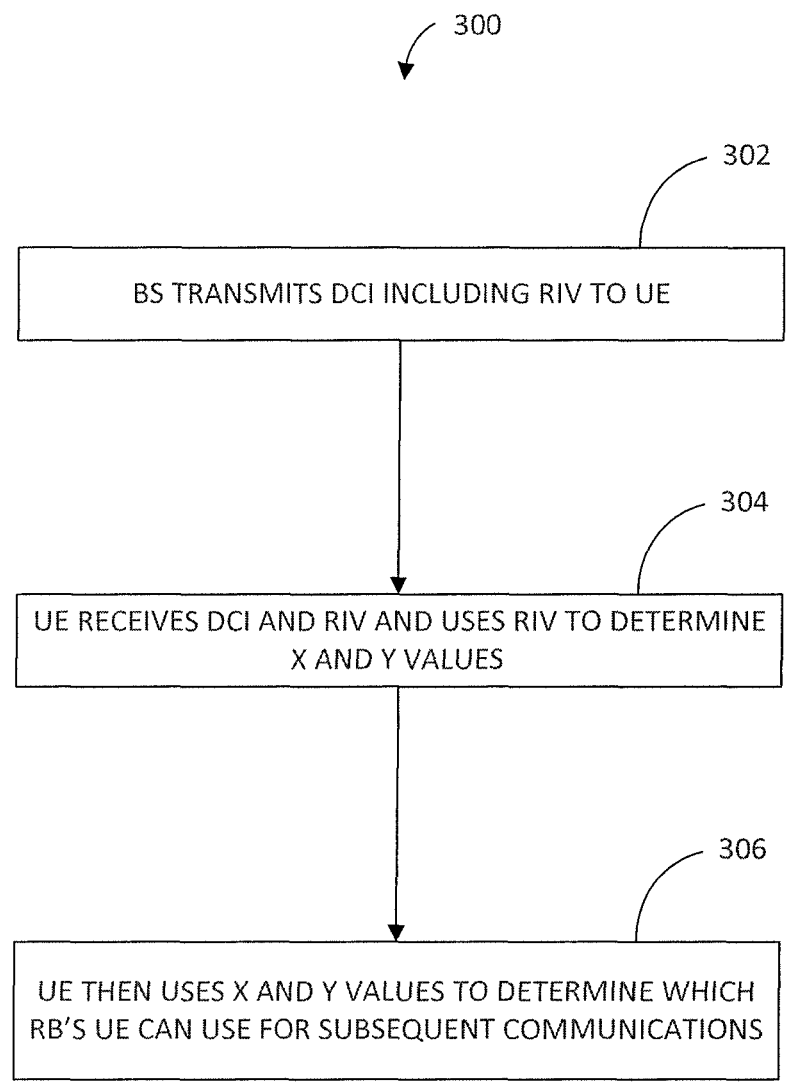
FIG. 3 illustrates a flowchart of a method of allocating resource blocks to a UE device, in accordance with some embodiments.

FIG. 3 illustrates a flowchart of a method 300 of allocating resource blocks to a UE device (e.g., a UE), in accordance with some embodiments. The method 300 starts at operation 302, in which a BS transmits control information (DCI) to UE through PDCCH. Such DCI includes one of the above-described methods to allocate the resource blocks. In other words, whenever a signal containing the DCI is transmitted to a UE, such a signal includes an RIV value, which corresponds to a pair of (x,y). Next, at operation 304, the UE receives the DCI and RIV and uses the RIV value contained in the signal to determine x and y values using the same equation used by the BS to calculate the RIV value. At operation 306, the UE then can use the x and y values to determine which resource blocks the UE can use for subsequent communications with the BS.

In some embodiments, if the BS uses equation (9) above to determine a RIV value and transmit a signal containing the RIV value and DCI, the UE can estimate (x,y) by using a respective Table (such as those discussed above) or by performing the following steps:

Step 1: Compare RIV and N
Step 2: If RIV≤N, then x=0, y=RIV.
Step 3: If RIV>N, then calculate the maximum integer value of U based on $$R = \sum_{i=0}^{U}(N+1-iL) \leq RIV, \text{ and } 1 \leq U \leq \left\lfloor\frac{N}{L}\right\rfloor.$$

So, x=U+1 and y=RIV−R.

In another embodiment, if the BS uses equation (12) above to determine a RIV value and transmit a signal containing the RIV value and DCI, the BS can estimate (x,y) by using a respective Table or by performing the following steps:

Step 1: Make RIV=RIV+1, and then compare RIV and N

Step 2: If RIV≤N, then x=0, y=RIV+1.

Step 3: If RIV>N, then calculate the maximum integer value of U based on $$R = \sum_{i=0}^{U}(N+1-iL) \le RIV, \text{ and } 1 \le U \le \left\lfloor \frac{N}{L} \right\rfloor.$$

So, x=U+1 and y=RIV−R.

In a further embodiment, if the BS uses equation (7) above to determine a RIV value and transmit the signal containing the RIV and DCI, the BS can estimate (x,y) by using a respective Table or by performing the following steps:

Step 1: Estimate N' based on N'=N−$x_{min}$L−$y_{min}$

Step 2: Compare RIV and N'

Step 3: If RIV≤N', then x=$x_{min}$, y=RIV+$y_{min}$

Step 4: If RIV>N', then calculate the maximum integer value of U based on $$R = \sum_{i=0}^{U}(N'+1-iL) \le RIV. \text{ So, } \begin{array}{l} x = U+1+x_{min} \\ y = RIV-R+y_{min} \end{array}.$$

In a further embodiment, if the BS uses equation (9-a) above to determine a RIV value and transmit the signal containing the RIV and DCI, the BS can estimate (x,y) by using a respective Table or by performing the following steps:

Step 1: Estimate U that is the maximum integer value satisfying $$R = \frac{U(U+1)L}{2} \le RIV$$

Step 2: Estimate (x,y) based on $$RIV = RIV - R, \text{ so } x = \left\lfloor \frac{RIV}{p} \right\rfloor$$

$$s = RIV \% p, \text{ so } y = N - UL - s$$

$$\text{where } p = \begin{cases} N\%L+1, & k = \left\lfloor \frac{N}{L} \right\rfloor \\ L, & \text{otherwise} \end{cases}$$

In a further embodiment, if the BS uses equation (7-b) above to determine a RIV value and transmit the signal containing the RIV and DCI, the BS can estimate (x,y) by using a respective Table or by performing the following steps:

Step 1: Estimate N' based on N=N−$x_{max}$L−$y_{min}$

Step 2: Calculate the maximum integer value of U based on $$R = N'U + \frac{LU(U-1)}{2} \le RIV$$

and 0≤U≤$x_{max}$ x=$x_{max}$−U

RIV=RIV−R;

Step 3: Estimate (x,y) based on y=N−xL−RIV+$y_{min}$.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method at a base station, comprising:
   determining a resource indication value (RIV) according to a first parameter, denoted as x, and a second parameter, denoted as y, wherein the first parameter x indicates a starting resource block location allocated to a user equipment and the second parameter y indicates a length of a sequence of resource blocks allocated to the user equipment, and a predefined relationship specifies that $xL+yQ \leq N$, where L and Q are predefined positive integers each larger than 1, and N represents a maximum number of available resource blocks that the base station can allocate to the user equipment; and
   transmitting, by a first communication device, the RIV to the user equipment.

2. The method of claim 1, wherein the RIV is indicative of a number of resource blocks to be allocated to the user equipment.

3. The method of claim 1, wherein L and Q are not equal to one another.

4. The method of claim 3, wherein L=PQ, and is a positive integer larger than 1.

5. The method of claim 1, further comprising:
   determining K bits for transmitting a plurality of sequences of resource blocks to the user equipment, according to:

$$K = \lceil \log_2 M \rceil, \text{ and}$$

$$M = (x_{3max} - x_{3min} + 1)\left[N' - y_{3min} + 1 - \frac{P(x_{3max} + x_{3min})}{2}\right],$$

where $x_{3min}$ is a minimum value of $x_3$, $x_{3max}$ is a maximum value of $x_3$, $x_3$ is a positive integer, and N' represents N/Q.

6. The method of claim 1, further comprising:
   determining the RIV according to:

$$RIV = (N' + 1 - x_{3min} - y_{3min}L)(x_3 - x_{3min}) - \frac{P(x_3 - x_{3min})(y_3 - x_{3min} - 1)}{2} + y_3 - y_{3min},$$

where $x_{3min}$ is a minimum value of $x_3$, $x_{3max}$ is a maximum value of $x_3$, $y_{3min}$ is a minimum value of $y_3$, $y_{3max}$ is a maximum value of $y_3$, $x_3$ and $y_3$ are positive integers, and N' represents N/Q.

7. The method of claim 1, wherein a number of possible different values of the RIV is limited by the predefined relationship $xL+yQ \leq N$.

8. A base station, comprising:
   at least one processor configured to determine a resource indication value (RIV) according to at least a first parameter, denoted as x, and a second parameter, denoted as y, wherein the first parameter x indicates a starting resource block location allocated to a user equipment and the second parameter y indicates a length of a sequence of resource blocks allocated to the user equipment, and a predefined relationship specifies that $xL+yQ \leq N$, where L and Q are predefined positive integers each larger than 1, and N represents a maximum number of available resource blocks that the base station can allocate to the user equipment; and
   a transmitter configured to transmit the RIV to the node user equipment.

9. The base station of claim 8 wherein the RIV is indicative of a number of resource blocks to be allocated to the user equipment.

10. The base station of claim 9, wherein L and Q are not equal to one another.

11. The base station of 10, wherein L=PQ, and P is a positive integer larger than 1.

12. The base station of 10, wherein the at least one processor is configured to determine K bits for transmitting a plurality of sequences of resource blocks to the user equipment, according to:

$$K = \lceil \log_2 M \rceil, \text{ and}$$

$$M = (x_{3max} - x_{3min} + 1)\left[N' - y_{3min} + 1 - \frac{P(x_{3max} + x_{3min})}{2}\right],$$

where $x_{3min}$ is a minimum value of $x_3$, $x_{3max}$ is a maximum value of $x_3$, $x_3$ is a positive integer, and N' represents N/Q.

13. The base station of 10, wherein the at least one processor is configured to determine the RIV according to:

$$RIV = (N' + 1 - x_{3min} - y_{3min}L)(x_3 - x_{3min}) - \frac{(y_3 - x_{3min} - 1)}{2} \cdot \frac{P(x_3 - x_{3min})}{} + y_3 - y_{3min},$$

where $x_{3min}$ is a minimum value of $x_3$, $x_{3max}$ is a maximum value of $x_3$, $y_{3min}$ is a minimum value of $y_3$, $y_{3max}$ is a maximum value of $y_3$, $x_3$ and $y_3$ are positive integers, and N' represents N/Q.

14. The base station of claim 9, wherein a number of possible different values of the RIV is limited by the predefined relationship xL+yQ≤N.

15. A method at a user equipment, comprising:
receiving a resource indication value (RIV) from a base station;
determining from the RIV, based on a predefined relationship between a first parameter, denoted as x, and a second parameter, denoted as y, a number of resource blocks allocated to the user equipment; and
performing further communication with the base station based on the determined number of resource blocks allocated to the user equipment,
wherein the first parameter x indicates a starting resource block location allocated to the user equipment, the second parameter y indicates a length of a sequence of resource blocks allocated to the user equipment, and the predefined relationship specifies that xL+yQ≤N, where L and Q are predefined positive integers each larger than 1, and N represents a maximum number of available resource blocks that the base station can allocate to the user equipment.

16. The method of claim 15, wherein a number of possible different values of the RIV is limited by the predefined relationship xL+yQ≤N.

17. A user equipment comprising:
a receiver configured to receive a resource indication value (RIV) from a base station;
at least one processor configured to:
determine from the RIV, based on a predefined relationship between a first parameter, denoted as x, and a second parameter, denoted as y, a number of resource blocks allocated to the user equipment; and
perform communication with the base station based on the determined number of resource blocks allocated to the user equipment,
wherein the first parameter x indicates a starting resource block location allocated to the user equipment, the second parameter y indicates a length of a sequence of resource blocks allocated to the user equipment, and the predefined relationship specifies that xL+yQ≤N, where L and Q are predefined positive integers each larger than 1, and N represents a maximum number of available resource blocks that the base station can allocate to the user equipment.

18. The user equipment of claim 17, wherein the at least one processor is configured to:
receive a plurality of sequences of resource blocks indicated by K bits, wherein the K bits are determined according to:

$$K = \lceil \log_2 M \rceil, \text{ and}$$

$$M = (x_{3max} - x_{3min} + 1)\left[N' - y_{3min} + 1 - \frac{P(x_{3max} + x_{3min})}{2}\right],$$

where $x_{3min}$ is a minimum value of $x_3$, $x_{3max}$ is a maximum value of $x_3$, $x_3$ is a positive integer, and N' represents N/Q.

19. The user equipment of claim 17, wherein the RIV is determined according to:

$$RIV = (N' + 1 - x_{3min} - y_{3min}L)(x_3 - x_{3min}) - \frac{(y_3 - x_{3min} - 1)}{2} \cdot \frac{P(x_3 - x_{3min})}{} + y_3 - y_{3min},$$

where $x_{3min}$ is a minimum value of $x_3$, $x_{3max}$ is a maximum value of $x_3$, $y_{3min}$ is a minimum value of $y_3$, $y_{3max}$ is a maximum value of $y_3$, $x_3$ and $y_3$ are positive integers, and N' represents N/Q.

20. The user equipment of claim 17, wherein a number of possible different values of the RIV is limited by the predefined relationship xL+yQ≤N.

* * * * *